April 5, 1966 T. J. LAVIN 3,244,867

FUNCTION GENERATOR WITH CURRENT LIMITING MEANS

Filed Oct. 26, 1960 3 Sheets-Sheet 1

INVENTOR.
THOMAS J. LAVIN
BY Charles J. Worth
AGENT

FUNCTION GENERATOR WITH CURRENT LIMITING MEANS

Filed Oct. 26, 1960 3 Sheets-Sheet 2

INVENTOR.
THOMAS J. LAVIN
BY Charles J. Worth
AGENT

April 5, 1966 T. J. LAVIN 3,244,867

FUNCTION GENERATOR WITH CURRENT LIMITING MEANS

Filed Oct. 26, 1960 3 Sheets-Sheet 3

INVENTOR.
THOMAS J. LAVIN
BY Charles J. Worth
AGENT

United States Patent Office 3,244,867

Patented Apr. 5, 1966

3,244,867

FUNCTION GENERATOR WITH CURRENT LIMITING MEANS

Thomas J. Lavin, Lodi, N.J., assignor to The Bendix Corporation, Teterboro, N.J., a corporation of Delaware Filed Oct. 26, 1960, Ser. No. 65,050
17 Claims. (Cl. 235—197)

Figure 1:
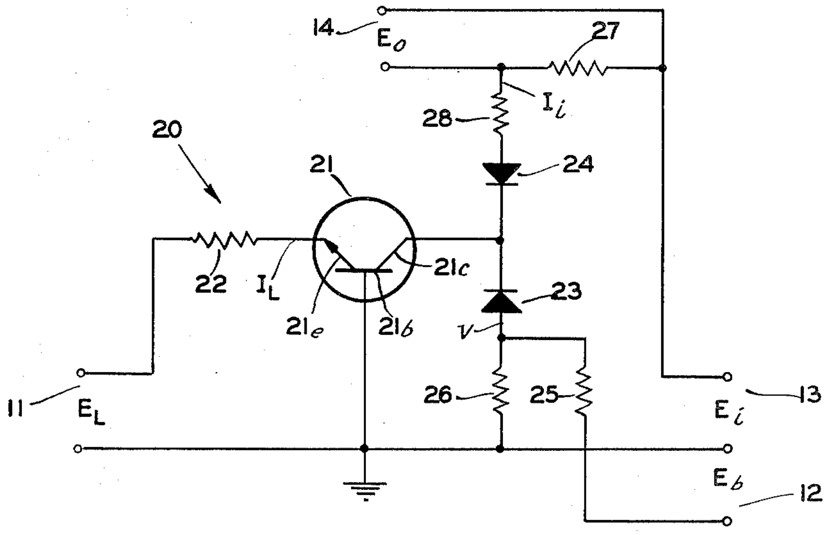

This invention relates to function generators and more specifically to wave shaping networks for providing direct current or voltage output as a predetermined nonlinear function of the input voltage.

These networks are particularly adapted to computers for attenuating a variable analog signal according to a nonlinear transfer characteristic to provide a resulting function signal that may be used for attenuating carrier or alternating voltage signals as shown and described in copending patent application Serial No. 58,790 of A. S. Robinson, W. Henn, and M. Teitelbaum, filed September 27, 1960, now abandoned, and assigned to the same assignee as the present invention.

Present solid state function generators using biased or Zener diodes are limited in application. The character of their components and arrangements subject them to inaccuracies which are amplified as more and more individual networks become operative. Such diode devices are also temperature sensitive and require high signal current.

An object of this invention is to provide a temperature insensitive solid state device which requires low power for its operation and derives an output signal according to a memorized transfer characteristic as a function of a variable direct voltage input.

Another object of this invention is to provide a solid state function generator having current limiting networks for deriving an output according to a non-linear transfer characteristic as a function of an input variable.

Another object of this invention is to provide a device of the kind described in which the transfer characteristic is a nonlinear curve comprising a plurality of independent segments each having a break-in point, a limit or break-out point, and a linear slope therebetween substantially independent of one another.

Another object of this invention is to provide a device for attenuating a variable direct voltage according to a memorized transfer characteristic of the kind described by using interlocked circuits each individually adjustable for varying the associated segment of the transfer characteristic.

This invention contemplates a function generator having an input adapted to receive an independent variable, and means connected to the input to provide an output signal corresponding to current flow. Current flow in the means is derived as a function of the input variable according to a nonlinear transfer characteristic provided by current transmitting networks representing segments of the transfer characteristic, each starting at a break-in point and having a maximum output limit. All of the networks are connected to the output means, each providing current flow according to an associated transfer characteristic segment as a function of the independent variable when the network is transmitting. Each network is connected to a voltage source to derive limiting current that limits its maximum current transmission and to another voltage source for deriving biasing voltage to block current transmission when the biasing voltage exceeds the independent variable.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figures 2, 3, 4:
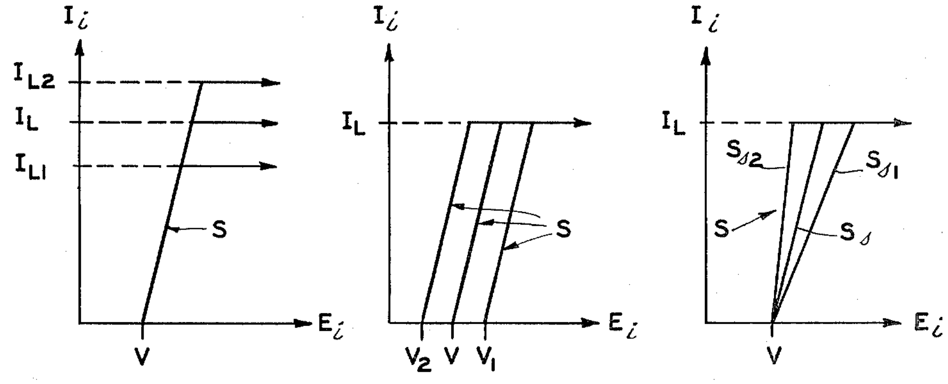
Figure 5:
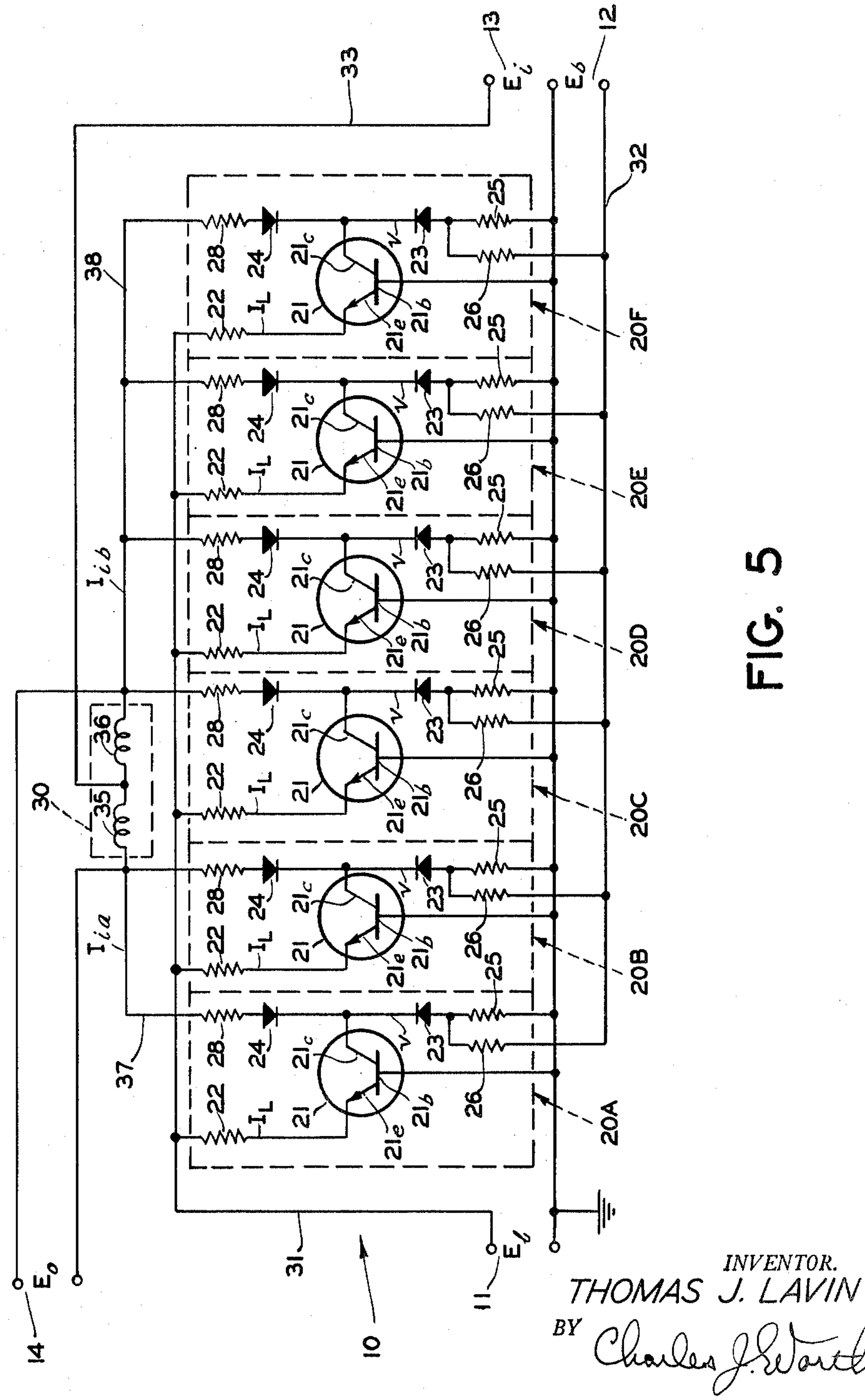
Figure 6:
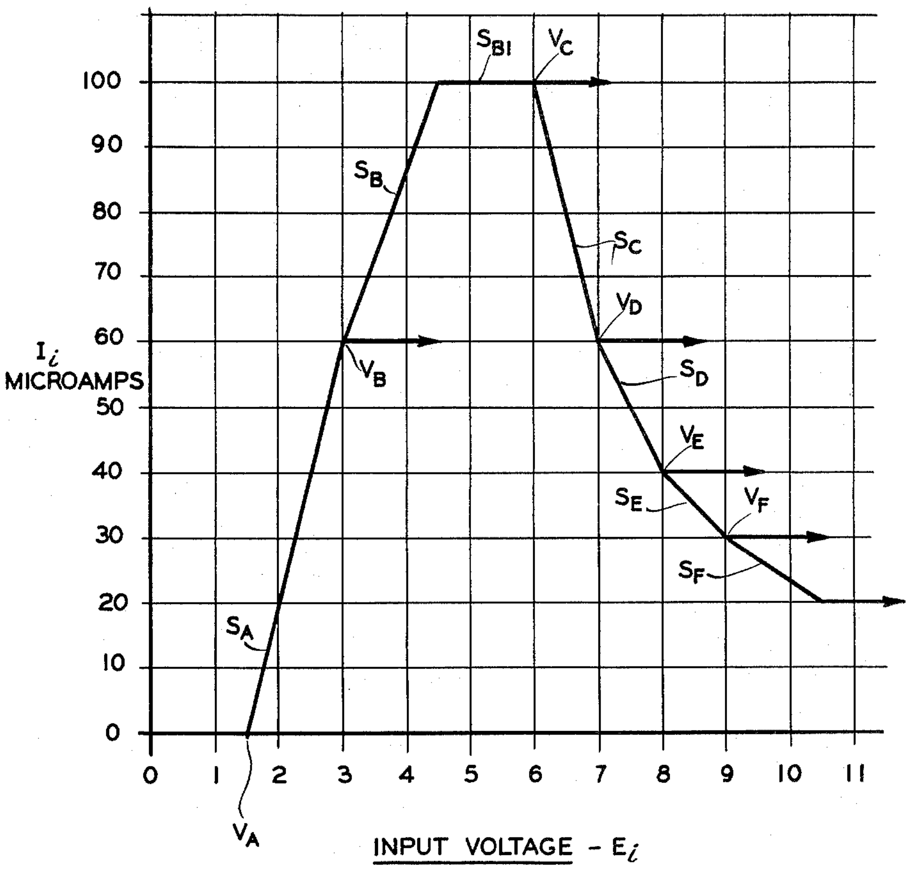

FIGURE 1 is a diagram of a current limiting network constructed according to the invention to provide an output according to a transfer characteristic and as a function of an input variable, FIGURES 2, 3, and 4 graphically show an individually variable segment limit, segment break-in point, and segment slope, respectively, of the transfer characteristic provided by the network of FIGURE 1, FIGURE 5 is a diagram of a typical function generator constructed according to the invention and embodying a plurality of interlocked networks of FIGURE 1 to provide a transfer characteristic having a plurality of increasing and decreasing segments, and, FIGURE 6 is a graph of one transfer characteristic that can be provided by the device of FIGURE 5.

When considering a function generator, its transfer characteristic is the relative running values of the input voltage $E_i$ to the corresponding running values of the derived current $I_1$ or the corresponding output voltage $E_o$. Where the transfer characteristic is nonlinear, it can be plotted as a curve approximated by a plurality of linear segments. Each segment commences at a break-in point and extends along a linear slope that represents linearly varying ratios of the input voltage $E_i$ to the output voltage $E_o$ or the derived current $I_1$. In biased or Zener diode function generators, the segments are semi-infinite linear slopes.

A function generator constructed according to this invention is comprised of a plurality of current limited networks. Each network has characteristics corresponding to one segment of the transfer characteristic having a break-in point or minimum limit, a break-out point or maximum limit and a linear slope therebetween. The derived current $I_1$ or the corresponding output voltage $E_o$ increases according to the linear slope as the input voltage or independent variable $E_i$ increases until the derived current $I_1$ reaches its current controlled maximum limit $I_L$ and remains constant with further increases of the independent variable $E_i$. This will be more clearly understood by referring to FIGURES 2, 3 and 4 which show a segment and the independent adjustments thereof, and to FIGURE 6 which shows a transfer characteristic comprised of a plurality of such segments.

A typical function generator 10, constructed according to this invention, for providing an output according to the multisegmented transfer characteristic of FIGURE 6 is shown in FIGURE 5 and is comprised of a plurality of interlocked current transmitting networks 20A, 20B, 20C, 20D, 20E and 20F each corresponding to the network 20 of FIGURE 1. The networks 20A . . . 20F have transfer characteristics corresponding to transfer segments $S_A$ . . . $S_F$ of the total transfer characteristic of the function generator 10.

While the total transfer characteristic of FIGURE 6 is limited to the linear slopes of segments $S_A$, and $S_C$ to $S_F$, the slope of segment $S_B$ arrives at its maximum limit prior to the break-in point $V_C$ of the following segment $S_C$ and a flat segment portion $S_{B1}$ provides a constant current $I_1$ at 100 microamps as input voltage $E_1$ increases from 4½ to 6 volts. Thus, a flat characteristic at the maximum limit of the segment of a network may be used to provide the transfer characteristic, if required, by retarding the break-in point of the following segment. Conversely, to provide an intermediate slope between two predetermined independent adjacent segments of two networks operating in sequence (not shown), requires the break-in point of the segment of the second sequenced network be advanced to occur prior to the maximum limit or output point of the transfer segment of the first sequenced network. By overlapping the operation of two networks in this manner, an additional transfer slope is obtained that is the mathematical sum of the individual segments of two networks concurrently transmitting between their limits.

Referring specifically to FIGURE 1, a high impedance, current transmitting network 20 has inputs 11, 12 and 13 for receiving limiting voltage $E_L$, biasing voltage $E_b$ and variable direct voltage $E_i$, respectively, and an output 14 for direct voltage $E_o$ derived according to a transfer characteristic as a function of the independent variable $E_i$. A transistor 21 has a base **21*b* connected to ground, and an emitter 21*e* connected to the input 11 by a resistor 22. The collector 21*c* of transistor 21 is connected to a pair of semiconductor diodes 23 and 24, oppositely disposed to one another, to provide a gate in the network 20. Input 12 is connected to diode 23 by a resistor 25 forming a voltage divider with a resistor 26 that connects diode 23 to ground. Input 13 is connected to diode 24 by a load resistor 27 in series with a resistor 28, while output 14 for the output voltage $E_o$ is connected across the load resistor 27**.

In a common or grounded base transistor network, such as network 20, emitter current controls the collector current as a function of the current amplification factor of the transistor. Thus, the maximum limit of the transfer characteristic segment S of network 20 is derived by limiting voltage $E_L$ applied at input 11 to provide a flow of limiting current $I_L$, as a function of resistor 22, in the circuit connected to emitter **21*e* of transistor 21. By changing the value of resistor 22, the limiting current $I_L$ can be varied independently, with substantially no change of the other limits of the transfer characteristic provided by network 20**, to provide decreased limiting current $I_{L1}$ or increased limiting current $I_{L2}$, as shown in FIGURE 2.

Biasing voltage $E_b$ applied at the input 12 is attenuated by the voltage divider network comprising resistors 25 and 26 to provide a voltage $v$ to back bias diode 24 so that it does not conduct. The back bias of diode 24 sets break-in point V of segment S and by changing the relative values of resistors 25 and 26, biasing voltage $v$ can be varied independently, with substantially no change of the other limits of the transfer characteristic provided by network 20, to provide an advanced break-in point $V_1$ or a retarded break-in point $V_2$, as shown in FIGURE 3.

The variable input voltage $E_i$ received at the input 13 provides a current $I_i$ as a function of resistors 27 and 28 when voltage $E_i$ exceeds voltage $v$ and forward current biases diode 24 to conduct. As the input voltage $E_i$ increases the input current $I_i$ will increase on slope $S_s$ of segments. Slope $S_s$ is determined by the sum of the resistances of resistors 27 and 28, the forward resistance of diodes 23 and 24, and the resistance of the voltage divider network. Resistor 27 is merely a load resistor and is common to all networks in the function generator, the forward resistances of diodes 23 and 24 are generally small, and the value of the voltage divider network sets the break-in point of segment S. By varying only the value of resistor 28, slope $S_s$ of segment S can be varied independently, with substantially no change of the other limits of the transfer characteristic provided by network 20, to provide a decreased slope $S_{s1}$ or an increased slope $S_{s2}$, as shown in FIGURE 4.

It should be understood that networks 20 can be manufactured with fixed resistors 22, 25, 26 and 28, and be used as building block components that are replaced to change a transfer characteristic, or be manufactured with variable resistors.

In function generators of the biased or Zener diode type, break-in points are subject to variation due to response of the diodes to temperature change. This is eliminated in the novel network 20 by interaction between substantially matched opposing diodes 23 and 24 which vary in unison in response to temperature changes.

With limiting voltage $E_L$ at input 11 to derive limiting current $I_L$, and biasing voltage $E_b$ at input 12 to provide attenuated voltage $v$ to back bias diode 24, the collector circuit has a current flow that is limited by the limiting current $I_L$ and the current amplification factor of transistor 21. Since the usual silicon transistor has a current amplification factor of approximately .97, to facilitate description, it will be considered as 1.0 or the maximum collector current will be considered equal to the limiting or emitter current $I_L$. The collector current forward biases diode 23 to conduct. As input voltage $E_i$ increases and diode 24 starts to conduct, current $I_i$ opposes the collector current being conducted by diode 23. When current $I_i$ equals limiting current $I_L$, diode 23 is back biased and no longer conducts. Transistor 21 acts as a high impedance path for collector current that exceeds limiting current $I_L$ thus, segment S reaches its maximum output limit when currents $I_i$ and $I_L$ are equal. Although there is a slight increase of segment S beyond its maximum limit, it is small and to facilitate description, will not be considered.

Referring again to FIGURE 5, the function generator 10 is comprised of six interlocked networks 20A, 20B, 20C, 20D, 20E, and 20F, each corresponding to network 20 of FIGURE 1. Although networks 20A . . . 20F sequentially operate in the order of their location in FIGURE 5, it is not to be considered as a limitation because correspondence of the sequences of operation and location is arbitrary and merely for convenience of description. Inputs 11, 12 and 13 are common to all networks 20A . . . 20F, with inputs 11 and 12 being connected thereto by lines 31 and 32, respectively. Input 13 is connected to a modulator 30, or path splitting resistance means, having a split control winding 35–36 corresponding to load resistor 27 of network 20 shown in FIGURE 1. Winding 35 is connected to networks 20A and 20B by a line 37 while winding 36 is connected to networks 20C, 20D, 20E and 20F by a line 38. Output 14 is common to all of the networks 20A . . . 20F and is connected across split winding 35–36 of modulator 30.

The resistors 28 included in each of the networks 20A . . . 20F are selected to provide transfer ratios or the slopes of segments $S_A$ . . . $S_F$ of the transfer characteristic of FIGURE 6 while resistors 25 and 26 of networks 20A . . . 20F are selected to provide an attenuated biasing voltage $v$ in the respective networks for deriving break-in points $V_A$ . . . $V_F$ of segments $S_A$ . . . $S_F$, respectively. Similarly, resistors 22 of networks 20A, 20C, 20D, and 20E are selected to provide limiting current $I_L$ to limit slopes of segments $S_A$, $S_C$, $S_D$ and $S_E$, respectively, coincidently with respective break-in points $V_B$, $V_D$, $V_E$, and $V_F$. Resistor 22 of network 20B is selected to provide a maximum limit of the slope of segment $S_B$ in advance of break-in point $V_C$ and provide a useable flat slope portion $S_{B1}$ at 100 microamps between 4½ and 6 volts. Resistor 22 of network 20F merely provides a maximum limit of segment $S_F$ at 20 microamps.

To derive the transfer characteristic of FIGURE 6, direct input voltage $E_i$ at input 13 is applied to the split modulator winding 35–36. When diode 24 of network 20A and/or 20B is conducting, current $I_{ia}$ is derived in line 37. When diode 24 of network 20C, 20D, 20E, and/or 20F is conducting, current $I_{ib}$ is derived in line 38. Since currents $I_{ia}$ and $I_{ib}$ oppose one another in the windings 35–36, the difference therebetween is the function characteristic $I_i$ that is derived by generator 10 as a function of the inut voltage $E_i$. The output voltage $E_o$ is obtained across the split winding 35–36, is therefore also derived as a function of the input voltage $E_i$ and is proportional to the difference between currents $I_{ia}$ and $I_{ib}$, or current $I_i$. Locations of the networks 20 of function generator 10 are not limited by sequence of operation, as previously discussed. However, when the desired transfer characteristic includes increasing and decreasing slopes, all networks, such as networks 20A and 20B, providing increasing sloped segments have a common connection, such as line 37, for the input variable $E_i$, and all the networks, such as networks 20C, 20D, 20E and 20F, providing decreasing sloped segments have another common connection for the input variable $E_i$.

With the limiting voltage $E_L$ at the input 11, a limiting current $I_L$ is provided in the emitter circuit of each of the networks 20A . . . 20F having a value determined by the respective resistors 22. Again, ignoring the current amplification factor of all the transistors 21, the respective maximum collector currents of networks 20A . . . 20F derive the maximum limits of the slopes $S_A$ . . . $S_F$ at 60, 100, 60, 40, 30, and 20 microamps, respectively, as shown in FIGURE 6.

Biasing voltage $E_b$ at the input 12 provides respective voltages $v$ in networks 20A . . . 20F to back bias associated diodes 24 and set the respective break-in points of sequenced segments $S_A$ . . . $S_F$ at 1½, 3, 6, 7, 8, and 9 volts, respective, as also shown in FIGURE 6.

As input voltage $E_i$ is increased from 0 to 1½ volts, no current flow $I_i$ is derived and, accordingly, there is no output voltage $E_o$. Passing 1½ volts, input voltage $E_i$ exceeds bias voltage $v$ of network 20A and provides current $I_{ia}$ in modulator winding 35 (current $I_i$ in the absence of current $I_{ib}$ in winding 36) sufficient to forward bias diode 24 of that network to conduct. As the voltage $E_i$ increases to 3 volts, current $I_{ia}$ or $I_i$ increases from 0 to 60 microamps, equal to the limiting current $I_L$ at its maximum limit. At 3 volts, input voltage $E_i$ starts to exceed the value voltage $v$ in network 20A and back biases the associated diode 23. Thus, at this point, current $I_{ia}$ or current $I_i$, in the absence of transmission by the remaining circuits 20B to 20F, remains substantially constant with further increases of the voltage $E_i$ due to the extremely high resistance path provided by transistor 21 and nonconducting diode 23 of network 20A.

However, at 3 volts, input voltage $E_i$ exceeds biasing voltage $v$ of network 20B and is sufficient to forward current bias its diode 24 to conduct providing the break-in point $V_B$ of segment $S_B$. Inasmuch as network 20A is at its maximum limit and is substantially unaffected by increases in voltage $E_i$, further increases in current $I_i$ or $I_{ia}$ are solely determined by network 20B along the slope of segment $S_B$ to a maximum of 40 microamps that equals limiting current $I_L$ of network 20B. At the maximum limit of the slope of segment $S_B$, networks 20A and 20B limit current $I_{ia}$ or $I_i$ to 100 microamps, and the input variable $E_i$ reaches a maximum value of 4½ volts. As input voltage $E_i$ increases to 6 volts, current $I_i$ or $I_{ia}$ remains at substantially the same value extending along the flat slope portion $S_{B1}$ of segment $S_B$ due to the high resistance of transistors 21 and nonconducting diodes 23 of networks 20A and 20B.

Therefore, increasing input voltage $E_i$ to 4½ volts has provided increasing current flow $I_{ia}$ or $I_i$ as a function of networks 20A and/or 20B. However, due to a lagging break-in point $V_C$ current $I_i$ remains constant between 4½ and 6 volts with increasing input voltage $E_i$. The increasing variable $E_i$ up to 6 volts have provided the increasing current $I_i$ that is equal to only $I_{ia}$ because none of the networks 20C, 20D, 20E, or 20F are active, thus no current $I_{ib}$ has been derived.

However, an increase of voltage $E_i$ beyond 6 volts is sufficient to overcome the blocking effects of voltage $v$ acting on diode 24 of network 20C. Voltage $E_i$ applied to modulator winding 36 forward current biases diode 24 of network 20C to conduct for deriving current $I_{ib}$ which summed with current $I_{ia}$ corresponds to current $I_i$. Further increases of input voltage $E_i$ to 11 volts follows the same sequence as previously described and sequentially activates networks 20D, 20E, and 20F to provide the remainder of the transfer characteristic as shown in FIGURE 6.

Due to the back biasing of diode 23 of a network 20, transmission of derived current $I_i$ is restricted to transistor 21 providing current transmission limited by the limiting or emitter circuit current $I_L$. Thus when derived current $I_i$ equals $I_L$, network 20 is biased from a low to a high resistance path, thus limiting the maximum current draw of each of the networks 20A . . . 20F to prevent a high current requirement of function generator 10. However, in biased or Zener diode function generators, the current flow continually increases with the increase of input voltage across each of the legs as may be seen in FIGURE 2 of the drawings of the previously mentioned application Serial No. 58,790, now abandoned.

As may be noted by again referring to FIGURE 3 of the same patent application, an error variation of any of the slopes of the transfer characteristic of diode function generators are perpetuated in the following slopes and in a case of multiple errors variations are cumulative. However, with the novel arrangement as herein described, each of the slopes $S_A$ . . . $S_F$ are independently provided by the respective networks 20A . . . 20F, with independently adjustable break-in points and maximum current flows. Accordingly, errors in the individual segments are not reflected in the following segments of the transfer characteristic.

Accordingly, the novel device, as described, is a function generator adapted to provide signals according to a transfer characteristic of increasing and decreasing segments as a function of an input variable, each segment being independently derived and current limited by one of a plurality of interlocked grounded base transistor networks unaffected by temperature changes.

While one embodiment of the invention has been illustrated and described in detail, it is to be expressly understood that the invention is not limited thereto. Various changes may also be made in the design and arrangement to the parts without departing from the spirit and scope of the invention as the same will now be understood by those skilled in the art.

What is claimed is:

1. A function generator having an input adapted to receive an independent variable, output means connected to the input to provide an output signal proportional to current flow derived according to a transfer characteristic having a break-in point and a break-out point and as a function of the independent variable, at least one network for transmitting current according to a segment of the transfer characteristic and being connected to the output means to provide current flow therein according to the associated transfer characteristic segment and as a function of the independent variable, and means in each network connected to a voltage source to limit current within the network to the value at the break-out point of the associated segment to limit maximum transmission by the network and connected to a source of biasing voltage for blocking transmission by the network when the biasing voltage exceeds the independent variable.

2. A function generator comprising an input adapted to receive an independent variable, output means connected to the input to provide an output signal proportional to current flow therein derived according to a transfer characteristic having at least one segment with a slope between minimum and maximum limits of the segment and as a function of the input variable, and a current transmitting network for each segment of the transfer characteristic and having a resistor connected to the output means to provide current flow therein according to an associated transfer characteristic segment slope and as a function of the independent variable, high impedance means in each network for limiting maximum current within the network at the value of the limit of the slope and transmission by the network according to the limit of its transfer characteristic segment, and gate means in each network connected to a source of biasing voltage and connecting the resistor to the impedance means for transmitting current from the resistor when the independent variable exceeds the biasing voltage and for blocking current transmission by the network when the biasing voltage exceeds the independent variable.

3. The function generator according to claim 2, which includes variable means in each network to provide current flow in the output means according to an adjusted slope of an associated transfer characteristic segment and as a function of the independent variable when the network is transmitting.

4. The function generator according to claim 2, in which the impedance means of each network is variable for independently adjusting the maximum current transmission by the network.

5. The function generator according to claim 2, in which each network has control means connecting the source of biasing voltage to the gate means to independently adjust the amplitude of the biasing voltage applied to the gate to block current transmission by the network.

6. A function generator having an input adapted to receive an independent variable, output means connected directly to the input to provide two paths for the independent variable and to provide an output signal proportional to the difference between current flow in the two paths derived according to a nonlinear transfer characteristic of increasing and decreasing limited segments and as a function of the input variable, current transmitting networks connected to one of the paths for the increasing segments and connected to the other path for the decreasing segments; each network comprising a resistor connected to one of the paths of the output means to provide current flow therein according to the associated transfer characteristic segment and as a function of the independent variable when the network is transmitting, semiconductor means for limiting maximum current transmission by the network, and semiconductor gate means connected to a source of biasing voltage and connecting the resistor to the semiconductor impedance means for transmitting current from the resistor when the independent variable exceeds the biasing voltage and for blocking current transmission by the network when biasing voltage exceeds the independent variable.

7. The function generator according to claim 6, in which each network includes a resistor connecting the associated semiconductor impedance means to a voltage source common to all the networks to provide predetermined limiting current to the semiconductor impendance means for determining the maximum current transmission by the associated network.

8. A function generator according to claim 6, in which each network includes a voltage divider connecting the associated gate to a voltage source common to all the networks to apply predetermined biasing voltage to the gate for blocking current transmission by the associated network when the predetermined biasing voltage exceeds the independent variable.

9. A function generator having an input adapted to receive an independent variable, output means connected directly to the input to provide two paths for the independent variable and to provide an output signal proportional to the difference between current flow in the two paths derived according to a nonlinear transfer characteristic of increasing and decreasing limited segments and as a function of the independent variable, current transmitting networks connected to one of the paths for increasing segments and connected to the other path for decreasing segments; each network comprising a resistor connected to the output means to provide current flow therein according to an associated transfer characteristic segment and as a function of the independent variable when the network is transmitting, a common base transistor having an emitter and a collector, a resistor connecting the emitter to a voltage source for deriving a limiting current in the emitter to limit current transmission by the collector, a voltage divider connected to a voltage source to provide a gate biasing voltage, and gate means connected to the voltage divider and connecting the resistor to the transistor collector for transmitting current from the resistor when the independent variable exceeds the biasing voltage and for blocking current transmission by the associated network when the biasing voltage exceeds the independent variable.

10. The function generator according to claim 9, in which the gate means is comprised of a first diode connecting the resistor to the collector to transmit current from the resistor when the independent variable exceeds the biasing voltage, and a second diode connecting the voltage divider to the connectoin between the first diode and the collector for applying the biasing voltage to the first diode to block current transmission when the biasing voltage exceeds the input variable, the second diode being back biased by the transmitted current when at a maximum according to the limiting current.

11. A control circuit comprising an input adapted to receive a signal and output means connected directly to the input to provide two paths for the signal and to provide an output according to current flow in the paths, current transmission control means connected to the paths and each having semiconductor means for limiting maximum transmission by the associated path and connected to a source of biasing voltage to block transmission by the associated path when the biasing voltage exceeds the output signal.

12. A control circuit comprising an input adapted to receive a signal and output means connected directly to the input to provide two paths for the signal and to provide an output according to current flow in the paths, current transmission control means connected to the paths and each comprising high impedance means to limit current flow in the associated path, and gate means connected to a source of biasing voltage to block current flow in the associated path when the biasing voltage exceeds the input signal.

13. A control circuit having an input adapted to receive a signal and output means connected directly to the input to provide two paths for the signal and to provide an output according to current flow in the paths, current transmission control means connected to the paths and each comprising a transistor with an emitter and a collector, resistance means connecting the emitter to a voltage source to provide limiting current in the emitter to limit current flow in the collector, a semiconductor diode connecting the resistor to the collector to transmit current from the resistor when the input signal exceeds a biasing voltage, and another semiconductor diode connecting a biasing voltage source to the semiconductor for blocking current transmission when the biasing voltage exceeds the input signal.

14. A function generator adapted to receive a variable signal and to provide an output corresponding to the signal according to a predetermined transfer characteristic, comprising a network for each segment of the transfer characteristic and having a transfer characteristic corresponding to the associated segment when transmitting current, each network having gating means to provide current flow in selected networks in response to the signal and means to limit the maximum current flow in the associated network to the current value at the end of the associated segment, and output means connected to all the networks and providing an output according to the transfer characteristic segments of the selected networks and as a function of the variable signal.

15. A solid state generator adapted to receive a variable signal and to provide an output corresponding to the signal according to a predetermined transfer characteristic, comprising a network for each segment of the transfer characteristic and having a transfer characteristic corresponding to the associated segment when transmitting current, each network having semiconductor diode means to provide current flow in selected networks in response to the signal and semiconductor high impedance means to limit the maximum current flow in the associated network, and output means connected to all the networks and providing an output according to the transfer characteristic segments of the selected networks and as a function of the variable signal.

16. A function generator adapted to receive a variable signal and to provide an output corresponding to the signal according to a predetermined transfer characteristic, comprising a network for each segment of the transfer characteristic and having a transfer characteristic corresponding to the associated segment when transmitting current, each network having a common base transistor with its emitter connected to a source of limiting current to limit the maximum current flow in the associated network and biased diode gate means to provide current flow in selected networks in response to the signal, and output means connected to all the networks and providing an output according to the transfer characteristic segments of the selected networks and as a function of the variable signal.

17. A function generator having an input adapted to receive an independent variable and an output to provide a signal as a function of the independent variable according to a transfer characteristic, at least one network connected between the input and the output to provide current flow according to a segment of the transfer characteristic and as a function of the independent variable, and gating means in each network connected to a source of biasing voltage for blocking transmission by the network when the biasing voltage exceeds the independent variable and connected to a current source to limit the signal by limiting current flow within the network.

References Cited by the Examiner

UNITED STATES PATENTS

| | | | |
|---|---|---|---|
| 2,831,107 | 4/1958 | Raymond et al. | 235—197 |
| 2,933,254 | 4/1960 | Goldberg et al. | 235—197 |
| 2,975,369 | 3/1961 | Vance | 235—197 X |
| 2,976,430 | 3/1961 | Sander | 235—197 X |
| 2,980,809 | 4/1961 | Teszer | 307—88.5 |
| 2,982,866 | 5/1961 | Chow | 307—88.5 |

MALCOLM A. MORRISON, *Primary Examiner.*

CORNELIUS D. ANGEL, *Examiner.*